Patented July 17, 1934

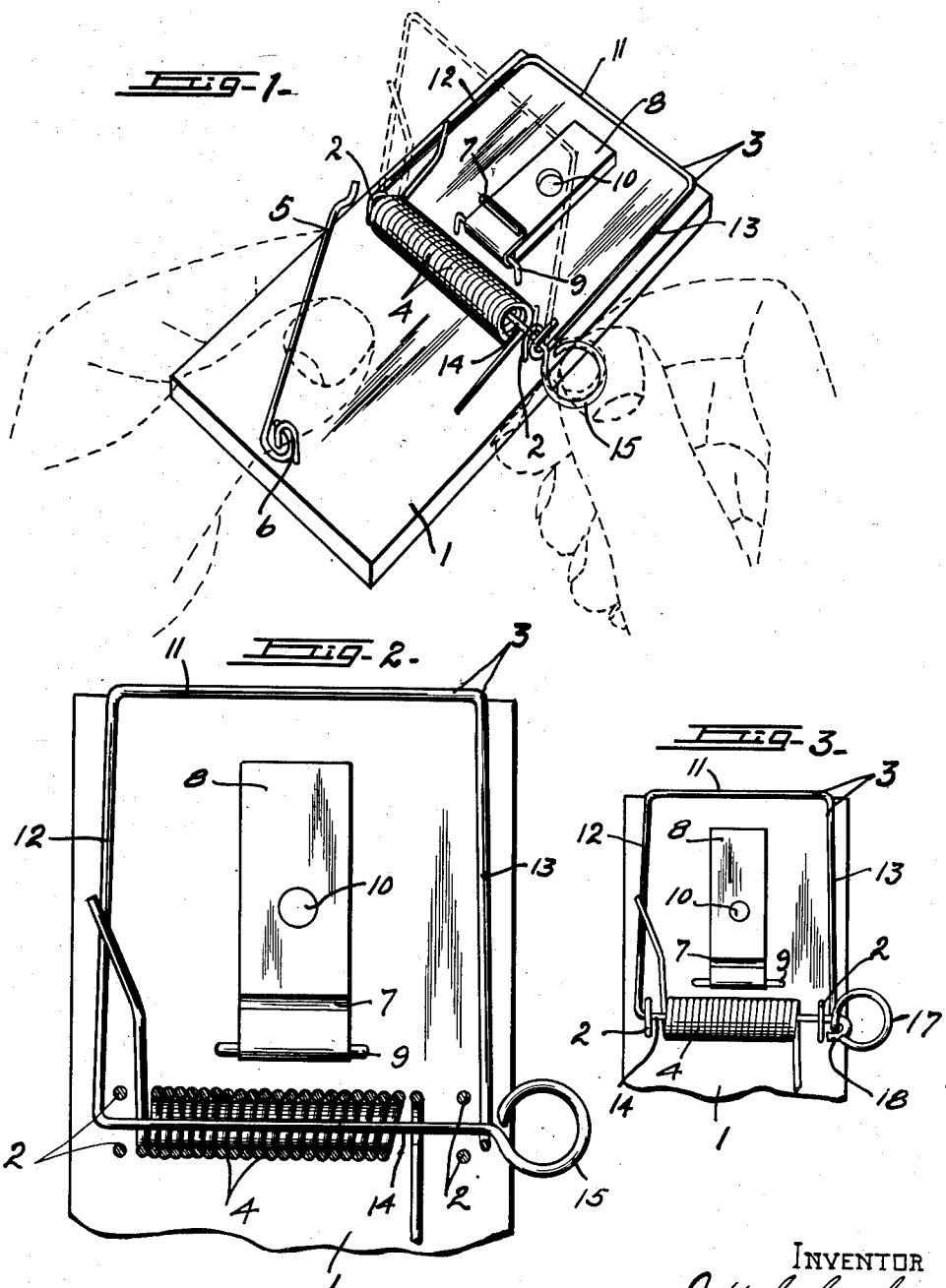

1,967,179

UNITED STATES PATENT OFFICE 1,967,179

ANIMAL TRAP

James Harry Schocke, Oneida, N. Y.

Application January 25, 1932, Serial No. 588,642

6 Claims. (Cl. 43—97)

This invention relates to new and useful improvements in animal traps and pertains more particularly to traps having a spring-actuated swinging striker or jaw adapted for trapping mice, rats or the like.

When an animal such as a mouse or rat is caught in a small conventional spring-actuated trap of the swinging jaw type, the jaw is usually swung by the spring when released by the latch bar with sufficient force to kill the animal by breaking its back, and in so doing, the jaw is imbedded, to a greater or less degree, in the body of the animal so that when removing the body from the trap, it is often necessary to pull it from engagement with the jaw which, owing to the amount of force it takes to raise the jaw and the inconvenient manner in which the jaw is raised, makes it an awkward and difficult operation.

The main object of this invention is to provide a trap of the above-mentioned class with a convenient economically constructed means whereby the jaw may be quickly and easily swung about its pivot for releasing the animal without it being necessary to touch or handle the animal.

Other objects and advantages relating to the structure and form and operation of the parts thereof, will more fully appear from the following description, taken in connection with the accompanying drawing wherein:—

Figure 1 is a perspective view of a trap embodying the various features of this invention.

Figure 2 is a top plan of a portion of the trap with the striker actuating spring shown in section.

Figure 3 is a plan view of a portion of a trap embodying a modified form of my invention.

The trap illustrated in Figures 1 and 2 of the drawing comprises a base 1 substantially rectangular in plan view. To the base 1 intermediate the ends thereof, is pivotally mounted as at 2 a swinging striker or jaw 3 which is actuated in the usual manner by a coiled spring 4 having one end engaging the base 1 and the other end engaging the striker 3.

A latch bar 5 is pivotally connected with the base 1 near one end thereof as at 6, and is adapted to extend inwardly over the spring 4 for engagement with a shoulder 7 formed on the inner end of a trigger plate 8 positioned at the opposite side of the spring 4 to that at which the latch is pivoted for releasably maintaining the jaw in the set position.

The trigger plate 8 is pivotally mounted at its inner end on the bridge portion of a U-shaped bar or staple 9 which has the legs thereof driven into or otherwise secured to the base 1. The trigger plate extends outwardly from the pivot 9 and is provided with a suitable bait-holding means such as the aperture 10.

The swinging striker or jaw 3 is preferably composed of a metal rod bent substantially U-shaped with a bridge portion 11 normally positioned in registration with or slightly beyond the end edge of the base 1 adjacent the trigger plate, while the legs as 12 and 13 of the jaw are made of unequal lengths with the longer leg as 12 bent at substantially right angles to itself intermediate its ends, to extend through the pivots 2, which in this instance, consist of staples driven into or otherwise secured to the base 1 and through the coiled spring 4 to form a pivotal shaft 14 for the jaw 3.

The outer end of the shaft 14 extends some distance beyond the adjacent pivot 2 and is bent to form a handle 15 arranged in axial alignment with said shaft and which may be conveniently utilized for swinging the jaw 3 about its pivot against the action of the spring 4 for releasing the animal caught in the trap. The other or shorter leg 13 of the jaw has the free end thereof looped about the shaft 14 between the handle 15 and the adjacent staple 2 for supporting the adjacent side of the jaw in the usual manner.

In practice to set the trap, the jaw 3 may be swung substantially 180° from the normal position adjacent the trigger plate 8 to the opposite or latch side of the base 1 in the conventional manner or by manipulating the handle 15, and then be releasably maintained in this position by moving the latch bar 15 over the bridge portion of the jaw and engaging the free end thereof with the shoulder 7 on the trigger plate 8 by rocking the free end of the plate upwardly in the usual manner.

As is now obvious, the handle 15 forms a convenient means for releasing the trapped animal without it being necessary to touch or handle the animal, and this may be accomplished by holding the latch end of the base in one hand and gripping the handle with the fingers of the other hand, as illustrated by dotted lines in Figure 1. The jaw may now be quickly swung upwardly away from the base 1 thereby permitting the animal to fall or to be shaken from the trap.

In Figure 3 is illustrated a modified form of my novel trap jaw and consists of bending the free end of the shorter leg 13 of the jaw 3 to form a convenient handle 17 which, like the handle 15, is in axial alignment with the shaft 14 so as to reduce to a minimum the liability of injury by providing for the least possible amount of movement to the handle during the swinging of the jaw. The outer end of the pivotal shaft 14 is looped as at 18 about the leg 13 adjacent the handle 17 for pivotally supporting the leg 13. In this latter construction, the jaw 3 may be readily swung about its pivot against the action of the spring 4 by manipulating the handle 17 in the same manner as described for the device shown in Figures 1 and 2.

Although I have shown and particularly described the preferred embodiments of my invention, I do not wish to be limited to the exact construction shown as various changes in the form and relation of the parts thereof may readily be made without departing from the spirit of this invention as set forth in the appended claims.

I claim:

1. A trap comprising a base, a spring-actuated U-shaped jaw member pivoted on the base and having one leg thereof extending across the open end of the jaw in parallel relation with the transverse portion of said jaw to form a pivotal supporting shaft for the jaw, the other leg of said jaw being attached to the outer end of the first-mentioned leg, one of said legs being extended outwardly from the point of said attachment and bent to form a handle by which the jaw may be swung to an open position.

2. A trap comprising a base, a spring-actuated U-shaped jaw member pivoted on the base and having one leg thereof extending across the open end of the jaw in parallel relation with the transverse portion of said jaw to form a pivotal supporting shaft for the jaw, the other leg of said jaw being attached to the outer end of the first-mentioned leg and extended outwardly therefrom to form a handle by which the jaw may be swung to an open position.

3. A trap comprising a base, a spring-actuated U-shaped jaw member pivoted on the base and having one leg thereof extending across the open end of the jaw in parallel relation with the transverse portion of said jaw to form a pivotal supporting shaft for the jaw, the outer end of said leg having the other leg of the jaw affixed thereto and extending outwardly from said affixed leg and bent to form a handle by which the jaw may be swung to an open position.

4. A trap comprising a base, a spring-actuated U-shaped jaw member pivoted on the base and having one leg thereof extending across the open end of the jaw in parallel relation with the transverse portion of said jaw to form a pivotal supporting shaft for the jaw, the other leg of said jaw being attached to the outer end of the first-mentioned leg, one of said legs being bent to form a handle extending outwardly from the point of said attachment, with the center of the handle in substantial alignment with the axis of said shaft whereby the jaw may be swung to an open position.

5. A trap comprising a base, a U-shaped jaw member having one leg thereof extending across the open end of the jaw in parallel relation with the transverse portion of said jaw to form a pivotal supporting shaft for the jaw, supporting means pivotally connecting said shaft to the base, a coil spring mounted on the shaft and engaging a leg of the jaw for urging the jaw to a position parallel with the base at one side of said supporting means, one of the legs of said jaw being bent to form a handle extending outwardly in substantial alignment with the axis of the spring whereby the jaw may be swung to an open position against the action of said spring.

6. An animal trap comprising in combination a base, a substantially rectangular jaw member formed of a single piece of wire, fastening means engaging an end element of the jaw member for pivotally securing said member to the base, a coil spring mounted on said end element and engaging a side element of the jaw for urging the jaw into contact with the base at one side of the fastening means, a side element of the jaw member being bent to form a handle extending outwardly from said side element and being adjacent the pivot and in the plane of the jaw to move in a plane at one side of the path of movement of said jaw whereby the jaw may be swung to an open position against the action of said spring.

JAMES HARRY SCHOCKE.